United States Patent [19]
Manca et al.

[11] 3,844,375
[45] Oct. 29, 1974

[54] NOISE SHIELD FOR JET ENGINE EXHAUST

[75] Inventors: Michael E. Manca, Bellevue; Robert H. Drinnon, Kent, both of Wash.

[73] Assignee: The Boeing Company, Seattle, Wash.

[22] Filed: Apr. 30, 1973

[21] Appl. No.: 356,022

[52] U.S. Cl............ 181/33 HC, 181/33 B, 181/33 E, 181/33 HD, 239/265.13, 239/265.19
[51] Int. Cl............................................ B64d 33/06
[58] Field of Search............ 181/33 B, 33 E, 33 HB, 181/33 HC, 33 HD; 239/265.13, 265.17, 265.19, 265.23, 265.33, 265.37

[56] References Cited
UNITED STATES PATENTS

| | | | |
|---|---|---|---|
| 2,625,008 | 1/1953 | Crook | 239/265.33 X |
| 3,027,710 | 4/1962 | Maytner | 181/33 HC |
| 3,174,282 | 3/1965 | Harrison | 181/33 HC UX |
| 3,621,933 | 11/1971 | Raynes | 181/33 E |
| 3,655,007 | 4/1972 | Hilbig | 181/33 E |
| 3,655,008 | 4/1972 | Millman | 181/33 E |

FOREIGN PATENTS OR APPLICATIONS

| | | | |
|---|---|---|---|
| 1,436,412 | 3/1966 | France | 181/33 HC |
| 987,507 | 3/1965 | Great Britain | 181/33 HC |

*Primary Examiner*—Richard B. Wilkinson
*Assistant Examiner*—John F. Gonzales
*Attorney, Agent, or Firm*—H. Gus Hartmann; Glenn Orlob

[57] ABSTRACT

A sound suppression apparatus for a jet engine mounted within the tail portion of an aircraft fuselage wherein a pair of aerodynamic surfaces extend outwardly and upwardly on each side of the fuselage and are mounted for movement about a lateral axis for varying their angle of incidence. The aerodynamic surfaces or panel members from a rear perspective view, form a "V" or "U" shaped configuration, with their point of intersection with the fuselage below the main stream of engine exhaust flow when a variable exhaust nozzle is in its takeoff and landing position or sound suppression mode. By varying the angle of incidence of the aerodynamic surfaces, the function to direct the streamwise airflow, adjacent to the external surface of the fuselage, sideways into the exhaust nozzle flow as to to come in underneath it, as an intermediate fluid stream. This intermediate airflow, causes a mixed boundary layer region beneath the engine exhaust flow which suppresses the downward radiation of the engine exhust noise. Normally, the noise in the exhaust flow would follow the surface contour of the exhaust duct or any extension thereof and spill over the end resulting in a substantial downward angle or come of noise radiation. However, through the introduction of the intermediate flow, a mixed boundary layer flow region is formed throughout the length of the exhaust duct and any undersurface extension thereof, which boundary layer detaches the noise flow from following the surface and provides for greater effectivity of noise deflecting surfaces or shields positioned about the exhaust flow.

2 Claims, 7 Drawing Figures

PATENTED OCT 29 1974

3,844,375

NOISE SHIELD FOR JET ENGINE EXHAUST

SUMMARY OF THE INVENTION

One of the problems confronting the operation of jet aircraft is the excessive noise over the surrounding airport community during takeoff, climb-out, letdown and landing. Through the present invention, the engine exhaust noise reaching the ground from an airborne aircraft is decreased by noise shields which deflect the downward angle of noise radiation so that people on the ground will be affected less by the noise. Generally, there is little concern about the noise emitted upwards from an aircraft; so, by properly locating a noise shield device under the exhaust nozzle of a jet engine, the downward angle or cone of noise radiation can be reduced. In addition to a noise deflector, the present invention introduces an intermediate flow between the exhaust flow and the noise shield. This injected intermediate flow causes a mixed boundary layer region between the exhaust flow and aft projecting devices under the exhaust nozzle exit, which functions to deflect the noise upwards with respect to the aircraft.

More particularly, the invention relates to a jet engine mounted in a nacelle having a pair of panels on each side of the nacelle which are positioned longitudinally adjacent to the exhaust flow from the nozzle exit. The panels extend laterally outward and upward into the airstream flow on each side of the nacelle forming a "U" or "V" configuration in rear perspective and they are either fixedly arranged or variable in angle of incidence so as to scoop the free airstream flow adjacent the nacelle into and underneath the engine exhaust flow. This injected intermediate airflow between the exhaust flow and the aft projecting variable ramp or noise shield device, forms a mixed flow or boundary layer region therebetween which functions to decrease the noise energy and suppress the downward radiation of the engine exhaust noise. Unless the intermediate mixed boundary layer flow is introduced between the engine thrust flow and the panels or surfaces over which the exhaust flow is directed, the bypass fan and engine noise contained in the exhaust thrust flow, would not be deflected upwardly, but would follow the contour of the clamshell panels sticking right to them and spilling or coming right over the end of the panels as if there were nothing back there to shield the noise.

For example, when you hold a megaphone up to your mouth it is very effective because the voice follows right down the side surface of the megaphone, but if you hold it away from your mouth, it is nowhere near as effective. Therefore, in order to suppress the noise in the shortest possible length so that it will be reflected upwards and not follow the surface of the shield like a megaphone and come off the end, it is necessary to scoop and pump the ambient or streamwise flow air into and under the engine thrust flow containing the noise.

The panels which extend laterally on each side of the nacelle may aerodynamically work against the horizontal stabilizer if not properly designed. However, due to the required relatively small area of the panels as an effective noise shield (with the injection of the intermediate flow) in comparison with the area of the horizontal stabilizer, their effectiveness as a destabilizing influence can be neglected at the aircraft speeds during takeoff and landing. For cruise flight speeds however, it would be necessary to vary the angle of incidence of the panels in order to affect as little as possible the aerodynamic action of the horizontal stabilizer.

Another advantage of the present invention is that it reasonably provides approximately 15 percent noise reduction whether it is incorporated into a high bypass ratio engine or a low bypass ratio engine. Although the actual dimensions may have to be somewhat different, the proportions of noise shield size relative to exhaust nozzle diameter, etc., as set forth infra, would be equally applicable to either a high or a low bypass ratio engine.

DESCRIPTION OF THE PREFERRED EMBODIMENTS

Figure 1:
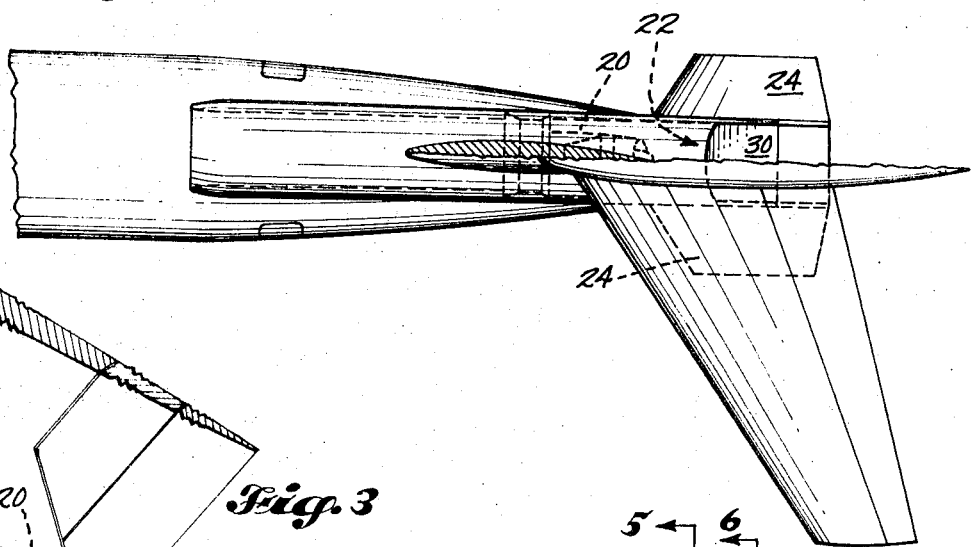
FIG. 1 is a plan view of a high bypass turbofan engine mounted in the tail portion of an aircraft fuselage with a T-tail and an air inlet duct on top of the fuselage. In the upper portion of the figure, the horizontal stabilizer has been removed to more clearly show the noise shield.
Figure 3:
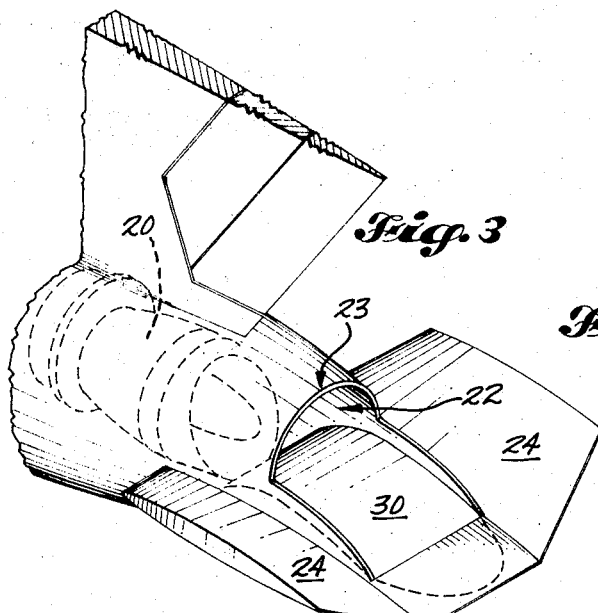
FIG. 3 is an enlarged rear perspective view showing the nozzle ramp in combination with the side panels.
Figure 4:
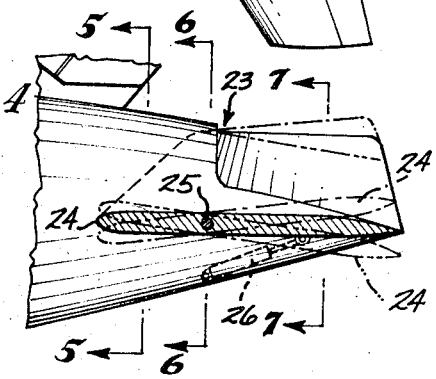
FIG. 4 is an enlarged side elevational view schematically depicting the actuator for varying the angle of incidence of the side extending panels.
Figure 5:
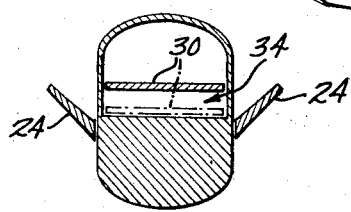
FIGS. 5, 6 and 7 are cross sectional views taken at 5—5, 6—6, and 7—7 respectively of FIG 4 and show the raised and lowered position of the nozzle ramp.
Figure 2:
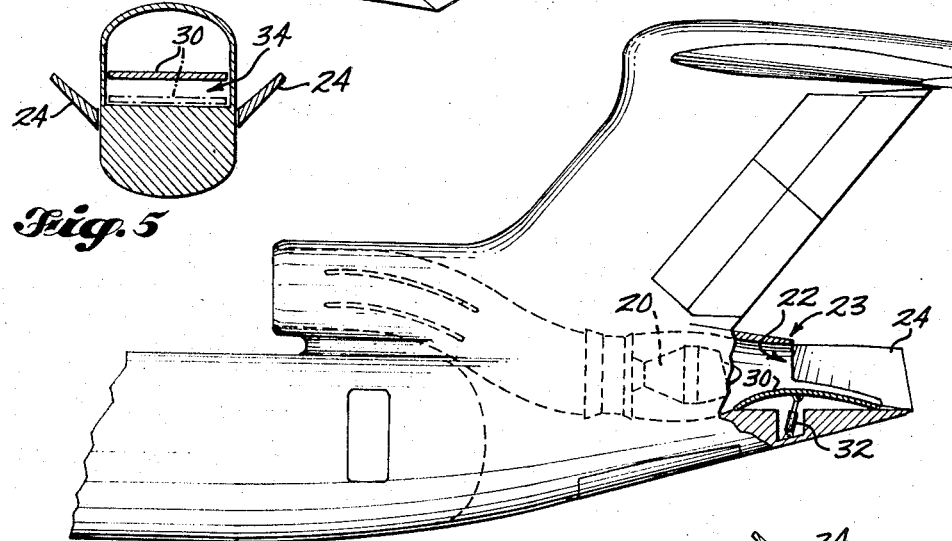
FIG. 2 is a side elevational view of FIG. 1.
Figure 6:
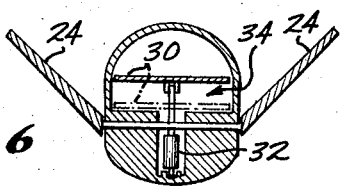
Figure 7:
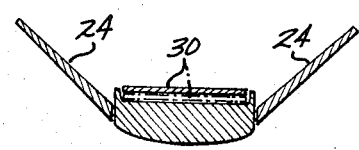

FIG. 1, is a plan view of the sound suppression apparatus of the present invention as installed on a high bypass turbojet engine 20 which is mounted in the tail portion of an aircraft fuselage. The thrust flow from the engine exhausts through a duct 22 and the vertical nozzle exit plane 23. A pair of noise shields or panels 24 are adjustably mounted along the sides of the fuselage tail portion adjacent to the engine exhaust nozzle and as shown in FIG. 4, are movable by actuator 26 about a lateral axis 25 for varying their angle of incidence. The panels extend laterally outward and upward from the fuselage, as shown in FIGS. 5–7.

The lower surface of the exhaust nozzle duct 22 comprises a variable ramp 30 that is raised and lowered by an actuator 32. During cruise flight speeds of the airplane, the variable ramp 30 is in the raised position. In this position, the ramp 30 forms the predetermined internal shape of an efficient high speed cruise nozzle. During low speed flight of the airplane, such as takeoff and landing, the variable ramp 30 is lowered and forms the desired internal shape and increased nozzle exhaust area for slow speed and sound suppression mode. It is necessary that the ramp 30 be lowered far enough below the cross-sectional area of the cruise thrust flow or below an aft extending cross-sectional profile of the cruise exhaust flow through the duct 22 so that the panels 24 can direct the free airstream flow into and underneath the exhaust flow containing the engine noise. The panels 24 extend laterally outward and upward from the fuselage, as shown in FIGS. 5–7, and they are positioned vertically with respect to the exhaust nozzle so as to intersect the exhaust nozzle exit plane at a point below that of the variable ramp 30 when it is at its cruise position. By varying the angle of incidence of the panels 24, the surfaces are angled to form a pair of rearwardly converging surfaces which scoop up the atmospheric airflow adjacent to the fuselage and direct it beneath the exhaust flow into the increased nozzle exit area or traversed space 34 left by the lowering of the variable ramp surface for the sound suppression mode. More particularly, the panels direct the airflow into the exhaust nozzle flow so as to come in underneath the engine exhaust flow as an intermediate fluid stream between the lower surface of the aft extending nozzle ramp 30 and the engine exhaust flow. This injected intermediate flow produces a mixed boundary layer fluid throughout the length of the aft extending ramp surface and the length of the side panels 24 adjacent thereto. This mixed boundary layer fluid detaches or deflects the engine thrust noise flow. Normally, the engine noise flow would follow the surface contour of the exhaust nozzle duct and spill over the end of the variable ramp; thereby, causing the flow containing the noise to turn downwardly. However, by injecting the intermediate fluid, the engine noise flow is turned upwardly, and the downward radiation of the noise is decreased.

The size of exhaust noise deflecting area or panels 24 can be determined by its proportionality to the diameter of the exhaust nozzle. The panel on each side of the fuselage is approximately three diameters in chord length adjacent to the exhaust nozzle, and approximately three diameters in semi-span from the side of the fuselage. In order to reduce the sideline noise radiation, the panels should provide a vertical deflecting area or cover up approximately 50 percent or more of the height of the exhaust flow at the nozzle exit plane. For additional side line noise shielding, vertical surfaces (not shown) may be attached to the panels outboard of the fuselage. With respect to the fore and aft positioning of the panels, as shown in the upper half of the plan view of FIG. 1, the panel 24 has its leading edge projecting forward of the nozzle opening in the side of the nacelle, by a minimum distance of approximately one-fourth of the nozzle diameter in order to provide for the sideline noise shielding. In rear view, as shown in FIGS. 5, 6, and 7, the panels 24 have their inner edge adjacent to the side of the exhaust duct such that they intersect the exhaust nozzle exit plane below the raised cruise flight position of the variable ramp in order to provide for an area 34 under the exhaust flow having a clearance height of approximately one-foruth nozzle diameter. The ramp 30 which forms the lower surface of the exhaust duct and nozzle, has to move down from its raised cruise flight position to its low speed takeoff and landing position by a predetermined distance of approximately one-fourth nozzle diameter. This is in order to permit the introduction of the free airstream flow under the engine thrust flow, which contains the fan and jet engine noise, and thereby produce a mixed boundary layer fluid throughout the length of the aft extending ramp surface and the length of the side panel noise shields. This mixed boundary layer fluid causes the noise contained in the exhaust flow to be detached from the surface contour of the aft extending surfaces from the nozzle exit plane. Normally, the noise will follow the surface contour of the exhaust duct and ramp 30 and spill over the end resulting in a substantial downward angle or cone of noise radiation. However, by injecting the intermediate fluid, the mixed boundary layer flow region formed throughout the length of the under surface enclosure of the exhaust flow, functions to maintain the noise flow detached from the surface and from following its contour; thereby, decreasing the downward angle of noise radiation so that people in the surrounding airport community won't notice the engine exhaust noise of the aricraft operating out of the airport.

While the invention has been disclosed with reference to a preferred embodiment, it is to be understood that those modifications and changes which become obvious to a person skilled in the art as a result of the teachings hereof, will be encompassed by the following claims.

What is claimed is:

1. Apparatus for shielding the sound of the exhaust nozzle flow from a jet engine mounted in an aircraft wherein the nozzle flow discharges over an aft extending variable ramp surface having a raised cruise flight position, and a lowered takeoff and landing position, comprising a pair of shield members adjustably mounted on opposite sides of the exhaust nozzle on an axis transverse to the longitudinal axis of the aircraft so as to extend laterally outwardly and upwardly therefrom and form rearwardly converging surfaces;

said shield members having a chord length adjacent the exhaust nozzle of not less than approximately three diameters of the exhaust nozzle and being positioned vertically on each side of the exhaust nozzle so as to intersect the exhaust nozzle exit plane below the raised cruise flight position of the vertical ramp;

means for varying the angular position of the shield members about their axes for scooping up atmospheric airflow adjacent to the exhaust nozzle and directing it into the increased nozzle exit area produced by the lowering of the variable ramp surface for the sound shielding mode so as to form an intermediate mixed boundary layer flow between the engine exhaust flow and the ramp surface for shielding the downward radiation of the engine exhaust noise during takeoff and landing of the aircraft.

2. The combination according to claim 1 comprising means for moving the variable ramp between the raised cruise flight position and the lowered takeoff and landing position, said lowered takeoff and landing position being located below said raised cruise flight position a distance approximately equal to one-fourth of the nozzle diameter.

* * * * *